US007155453B2

(12) United States Patent
Kincaid

(10) Patent No.: US 7,155,453 B2
(45) Date of Patent: Dec. 26, 2006

(54) BIOTECHNOLOGY INFORMATION NAMING SYSTEM

(75) Inventor: Robert Kincaid, Half Moon Bay, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 434 days.

(21) Appl. No.: 10/154,529

(22) Filed: May 22, 2002

(65) Prior Publication Data

US 2003/0220910 A1 Nov. 27, 2003

(51) Int. Cl.
*G06F 17/30* (2006.01)

(52) U.S. Cl. .......................... 707/104.1; 707/3
(58) Field of Classification Search ............. 707/3, 707/4, 104.1, 10, 102
See application file for complete search history.

(56) References Cited

U.S. PATENT DOCUMENTS

| | | | |
|---|---|---|---|
| 5,418,944 A | 5/1995 | DiPace | |
| 5,577,239 A | 11/1996 | Moore et al. | |
| 5,706,498 A | 1/1998 | Fujimiya | |
| 5,752,019 A * | 5/1998 | Rigoutsos et al. | 707/3 |
| 5,950,192 A | 9/1999 | Moore et al. | |
| 5,953,727 A | 9/1999 | Maslyn et al. | |
| 5,966,711 A | 10/1999 | Adams | |
| 5,966,712 A | 10/1999 | Sabatini et al. | |
| 5,970,500 A | 10/1999 | Sabatini et al. | |
| 6,023,659 A | 2/2000 | Seilhamer et al. | |
| 6,189,013 B1 | 2/2001 | Maslyn et al. | |
| 6,256,647 B1 | 7/2001 | Toh | |
| 6,282,550 B1 | 8/2001 | Ventakatesan et al. | |
| 6,304,869 B1 | 10/2001 | Moore et al. | |
| 6,308,170 B1 * | 10/2001 | Balaban | 707/3 |
| 6,408,308 B1 * | 6/2002 | Maslyn et al. | 707/104.1 |
| 6,496,832 B1 | 12/2002 | Chi et al. | |
| 6,519,611 B1 * | 2/2003 | Zong | 707/104.1 |
| 6,532,462 B1 * | 3/2003 | Balaban | 707/4 |
| 6,675,166 B1 * | 1/2004 | Bova | 707/10 |
| 6,732,121 B1 * | 5/2004 | El-Gazzar | 707/104.1 |
| 6,742,004 B1 * | 5/2004 | Sabatini et al. | 707/104.1 |
| 6,745,204 B1 * | 6/2004 | Hogue et al. | 707/104.1 |
| 2002/0062307 A1 | 5/2002 | Gilbert et al. | |

(Continued)

OTHER PUBLICATIONS

Exkman et al., Optimized Seamless Integration of Bimolecular Data, Bioinformatics and Bioengineering Conference, 2001. Proceddings of the IEEE 2nd International, Nov. 4-6, 2001, pp. 23-32.*

(Continued)

*Primary Examiner*—Greta Robinson

(57) ABSTRACT

Systems and methods for performing programmatic queries about molecular and biomolecule information. The methods comprise creating one or more databases of molecular data formatted or conditioned according to a directory service protocol, forming, by a user, a query based on a molecular identifier or other molecular indicia, submitting the query to a name server, performing a lookup in the databases based on the molecular name or identifier, retrieving a query result or results from the databases, and returning the query results to the user. The systems comprise at least one client computer, at least one name server operatively coupled to the client computer, at least one database operatively coupled to the name server and containing data formatted or conditioned according to a directory service protocol, at least one client application configured to generate queries based on molecular identifiers and receive results based the queries, and a directory service associated with the name server configured perform lookups in the database based on the query and retrieve results responsive to the query.

41 Claims, 7 Drawing Sheets

U.S. PATENT DOCUMENTS

| | | | |
|---|---|---|---|
| 2002/0064792 A1 | 5/2002 | Lincoln et al. | |
| 2002/0069208 A1 | 6/2002 | Rines | |
| 2002/0082869 A1 | 6/2002 | Anderson | |
| 2002/0095261 A1 | 7/2002 | Gut et al. | |
| 2002/0178184 A1 | 11/2002 | Kuchinsky et al. | |
| 2002/0194201 A1* | 12/2002 | Wilbanks et al. | 707/104.1 |

OTHER PUBLICATIONS

Timothy A. Howes, "The lightweight Directory Access Protocol: X.500 Lite", Citi Technical Report 95-8, University of Michigan, Jul. 27, 1995, pp. 1-9.

Benson, et al; "GenBank", Nucleic Acids Research, 1999, vol. 27, No. 1, Revised, Oct. 5, 1998, Accepted Oct. 5, 1998, Abstract, pp. 38-43.

Benson, et al; "GenBank", Nucleic Acids Research, 2000, Vo. 28, No. 1, Revised Oct. 4, 1999; Accepted Oct. 13, 1999, Abstract, pp. 15-18.

Pruitt, et al. "RefSeq and LocusLink: NCBI gene-centerered resources", Nucleic Acids Research, 2001, vol. 29, No. 1, Received Oct. 2, 2000; Accepted Oct. 4, 2000, pp. 137-140.

Berman, et al. "The Protein Data Bank", Nucleic Acids Research, 2000, vol. 28, No. 1, Received Sep. 20, 1999, Revised and Accepted Oct. 17, 1999; pp. 235-242.

W. Yeong, "Lightweight Directory Access Protocol", Mar. 1995, www.ietf.org/rfc/rfc1777.txt pp. 1-22.

P. Mockapetris, "Domain Names-Concepts and Faxilities", www.ieft.org/rfc/rfc/1034.txt pp. 1-55.

"The Source for Java Technology" JNDI ,, www.java.sun.com/search.java/jndi 2 pages, web page.

NCBI, LocusLink, Introduction, www.ncbi.nlm.nib.gov/LocusLinks 2 pages, web page.

GeneCards, www.bioinformatic.weizmann.ac.il/cards/ 2 pages, web page.

NCBI, National Center for Biotechnology Information, www.ncbi.nlm.nih.gov/ 3 pages, web page.

PPB "Protein Data Bank" www.rcsb.org/pdg/ 2 pages, web page.

OMG, Object Management Group, www.omg.org/ 2 pages, web page.

Pending U.S. Appl. No. 10/033,823, filed Dec. 19, 2001.
Pending U.S. Appl. No. 10/155,675, filed May 22, 2002.
Pending U.S. Appl. No. 10/155,405, filed May 22, 2002.
Pending U.S. Appl. No. 10/155,304, filed May 22, 2002.
Pending U.S. Appl. No. 10/555,616, filed May 22, 2002.
Pending U.S. Appl. No. 10/154,524, filed May 22, 2002.
Pending U.S. Appl. No. 10/641,492, filed Aug. 14, 2003.
Pending U.S. Appl. No. 10/642,376, filed Aug. 14, 2003.

* cited by examiner

```
C:\>bnslookup TNF
LOCUS ID       7124
GENE SYMBOL    TNF
ALIAS SYMBOL   DIF;TNFA;TNFSF2
ORGANISM       Homo sapiens
DESCRIPTION    tumor necrosis factor (TNF superfamily, member 2)
UNIGENE ID     Hs.241570
REFSEQ MRNA    NM_000594
REFSEQ PROT    NP_000585
PRODUCT        tumor necrosis factor (cachectin)
GENBANK ACCN   M16441;M26331;X02910;M10988;X01394
GO PROCESS     apoptosis;necrosis;anti-apoptosis;response to viruses;signal transd
uction;cell signalling;response to wounding;inflammatory response;leukocyte
cell adhesion;transcription regulation;response to pest/pathogen/parasite
GO COMPONENT   soluble fraction
GO FUNCTION    tumor necrosis factor receptor ligand
CHROMOSOME     6p21.3
SUMMARY        TNF plays a central role in the pathophysiology of sepsis. High lev
els of TNF alpha correlates with increased disease severity in severe bacterial
infection and malaria TNF alpha signaling may lead to activation of NF kappa B a
nd induction of apoptosis.

BIOTECHNOLOGY INFORMATION NAMING SYSTEM

BACKGROUND OF THE INVENTION

Scientists and researchers working in genomics and proteomics fields have traditionally utilized databases containing DNA sequence information. These scientists and researchers increasingly work with data associated with all points along the lifecycle of the cellular transcription process. While many insights into the overall lifecycle of the cellular transcription process can be gained from gene expression data and other sequence information, understanding the overall state of a cell also requires information about protein expression, post-translation protein modifications such as protein folding considerations and glycosylation, and molecular interactions such as protein subunit arrangements.

As scientists increasingly are performing experiments to correlate gene data and protein data, there is an increasing need to compare protein characterization and measurement data with corresponding genetic data. Both gene and protein data are increasingly available to scientists, but no convenient method is available for correlating or mapping the different types of data. Association of the different types of data has until now been carried out laboriously by hand.

With the increasing use of high throughput technologies in molecular biology and related fields, it is becoming increasingly difficult for scientists and researchers to track and correlate gene and protein data. It also increasingly difficult to track and make reference to the growing number molecular identifiers used in association with different databases. This is due to both the quantity of data being handled, as well as the number and inconsistency of available identifier systems such as, for example, Genbank accession numbers, Unigene cluster identifiers, clone identifiers, RefSeq accession numbers, and other identification information. Effective association or correlation of important data by hand is no longer feasible.

One approach to providing biotechnology data has been provided by searchable web portals that allow manual location of information usable for tracing associations between data. Single HTML-based queries are used to interface curated sequence information with descriptive information. The available correlating and mapping systems, however, do not provide any standards-based services that can be used by scientists and researchers to easily build informatics architectures of correlated data from available databases.

There is accordingly a need for systems and methods that provide a high-performance, ubiquitous infrastructure or architecture for accessing and correlating gene information and related protein information. The present invention satisfies these needs, as well as others, and generally overcomes the deficiencies found in the background art.

SUMMARY OF THE INVENTION

The invention provides systems and methods for performing programmatic queries about biomolecular information. The inventive systems and methods allow fast, high-volume lookups of biomolecular data and provide for resolving search results according to selectable naming and identifier schemes. The methods of the invention comprise, in general terms, creating a query based on a molecular identifier, submitting the query to a name directory service, performing a lookup in a database of the name directory service by a name server, and resolving a query result by a name service application programming interface. The creating of the query may be carried out by a client application capable of accepting the query result from the name service application programming interface. The methods may further comprise returning the query result to the client application. The methods may further comprise replicating data in the database by the name directory service.

The molecular identifier may comprise a gene name, a gene symbol, a Locus Identification number, a chromosome location, an mRNA RefSeq number, a protein RefSeq number, a proprietary molecular identifier, a public molecular identifier, or other identifier. The resolving may comprise annotating the query result. In certain embodiments, the query may be created using a first molecular identifier, and the query results may be resolved using the first molecular identifier or, in other embodiments, with a second, different molecular identifier. The second identifier may be related to the first identifier.

The systems of the invention comprise, in general terms, at least one client computer including programming capable of generating a query using a first molecular identifier and accepting a query result, a name directory service including at least one database containing biomolecule data and at least one name server including programming capable of performing a lookup in the database according to the query and retrieving a query result from the database, and a name application programming interface associated with at least one of the name server and the client computer and capable of submitting the query to the name directory service and resolving the query result.

In certain embodiments, the name directory service may comprise Lightweight Directory Access Protocol. The name application programming interface may comprise programming configured to annotate the query result, programming configured to resolve the query result according to the first molecular identifier, programming configured to resolve the query result according to a second molecular identifier, or programming for resolution of query results according to other schemes. The second identifier may be related to the first identifier. The first molecular identifier may comprise a gene identifier, while the second molecular identifier may comprise a protein identifier, and vice versa.

These and other objects, advantages, and features of the invention will become apparent to those persons skilled in the art upon reading the details of the invention as more fully described below.

BRIEF DESCRIPTION OF THE DRAWINGS

The invention will be more fully understood by reference to the following drawings, which are for illustrative purposes only.

FIG. 4 is an illustration of a visual user interface showing the search results of a name lookup application in accordance with the present invention.

FIG. 6 is an illustration of a visual user interface showing the search results of a name annotation application in accordance with the present invention.

FIG. 7 is an illustration of a visual user interface showing the search results of a name query application in accordance with the present invention.

DETAILED DESCRIPTION OF THE INVENTION

Before the subject invention is described further, it should be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Any definitions herein are provided for reason of clarity, and should not be considered as limiting. The technical and scientific terms used herein are intended to have the same meaning as commonly understood by one of ordinary skill in the art to which the invention pertains.

As used herein, "nucleic acid" and grammatical equivalents thereof means a nucleotide monomer, oligomer or polymer.

As used herein, "nucleotide" and grammatical equivalents thereof refers to a nucleic acid that includes a phosphate group, a 5-carbon sugar and a nitrogen-containing base, as well as analogs of such subunits. "Nucleotide" includes deoxyribonucleotides and ribonucleotides.

As used herein, "ribonucleic acid", "RNA" and grammatical equivalents thereof means a monomer, polymer or oligomer composed of ribonucleotides.

As used herein, "deoxyribonucleic acid", "DNA" and grammatical equivalents thereof means a polymer composed of deoxyribonucleotides.

As used herein, "peptide" and grammatical equivalents thereof refers to any compound produced by amide formation between a carboxyl group of one amino acid and an amino group of another group.

As used herein, "protein" and grammatical equivalents thereof refers to polypeptides of specific sequence of more than about 50 residues.

Referring more specifically to the drawings, for illustrative purposes the present invention is embodied in the systems and methods shown generally in FIG. 1 through FIG. 7. It will be appreciated that the system may vary as to configuration and as to details of the parts, and that the method may vary as to detail and the order of the events or acts, without departing from the basic concepts as disclosed herein. The invention is disclosed primarily in terms of use with biomolecule names and biotechnology information. However, it will be readily apparent to those skilled in the art that the invention may be used in a variety of naming systems, including pharmaceutical, chemical, medical, and the like. It should also be apparent to those skilled in the art that various functional components of the invention as described herein may share the same logic and be implemented within the same circuit, or in different circuit configurations. The software aspects of the invention are distributed in nature, and may be embodied in many configurations within the client-server computer systems of the invention.

Systems

Figure 1:
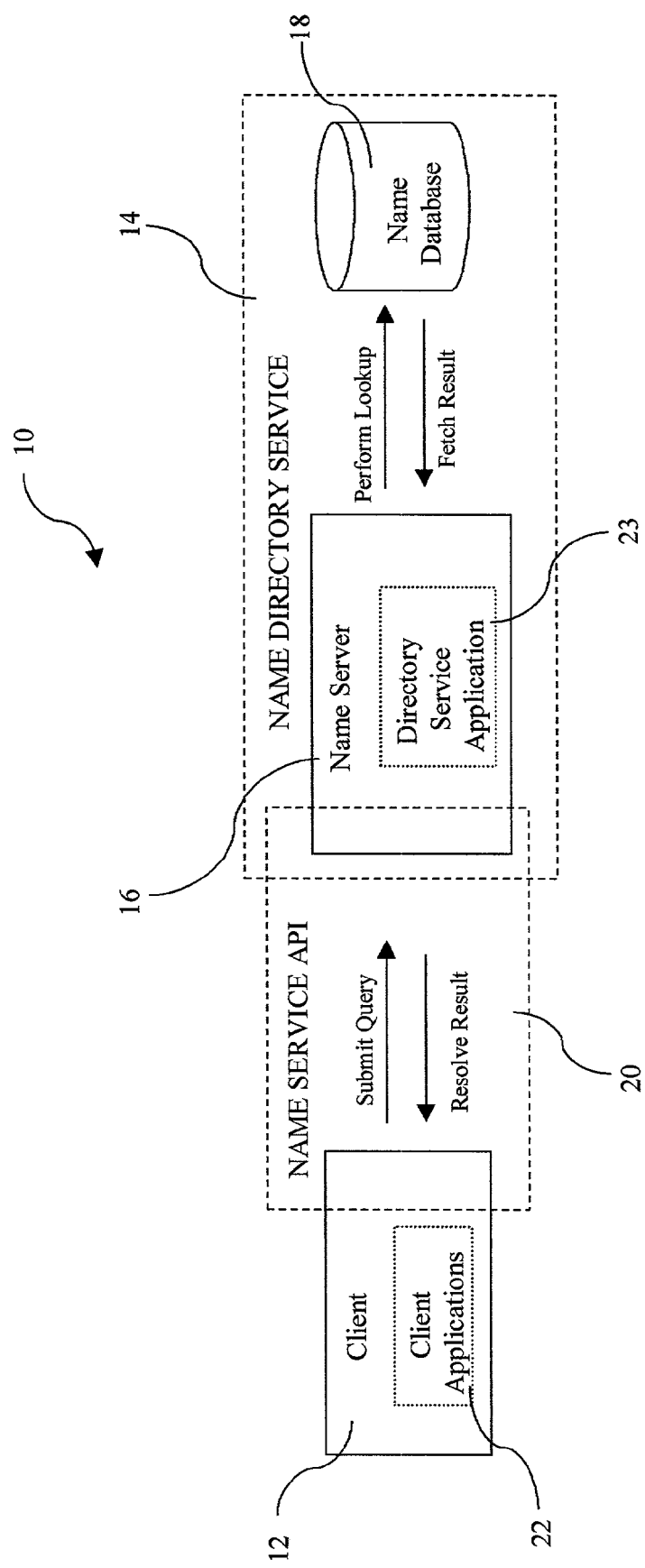
FIG. 1 is a schematic diagram that provides an overview of the system and method of the invention.

Referring now to FIG. 1, an overview of a naming system 10 in accordance with the invention is shown. The system 10 includes at least one client machine computer 12, and a name directory service 14 operatively coupled to the client computer 12. The name directory service comprises at least one name server computer 16 operatively coupled to client computer 12, and at least one database 18 operatively coupled to the name server 14. A name service application programming interface or API 20 is associated with the client computer 12 and name directory service 14.

A client application 22 associated with client computer 12 includes programming that allow users of client 12 to formulate or create queries based on names or identifying terms or indicia which may comprise, in many embodiments, biomolecular or biotechnology-based names or identifiers, and to receive results responsive to the queries. Directory service programming 23 associated with name server 16 is capable of performing lookups in database 16 based on the queries, and retrieving or fetching query results from the database 16. Name service API 20 includes programming or logic associated with client computer 12, name server 16, or both, that is capable of submitting queries from client 12 to name server 16 according to the protocol(s) of the name directory service 14, and resolving query results for the client 12 according to various naming and/or identifier schemes, and return the results to client computer 12. Database 16 includes molecular data, such as genomic, proteomic and/or other biotechnology data.

The system 10 of the invention provides a low-level, ubiquitous, open-access service system that allows users of client computer 12 to perform programmatic queries of database 16 for biomolecular information. The name directory service 14 can provide rapid responses to high volumes of lookup or search operations based on biomolecular identifiers, while the name service API 20 resolves query results across various naming and/or identifier schemes. This resolution may comprise converting search results according to a particular identifier scheme, converting search results between molecular entity types such as nucleic acid and protein, converting search results between common names and identifiers and vice versa, and other forms of query result resolution as described further below. The system 10 allows resolution of molecular names and molecular identifiers from various different, related database sources. In many embodiments as described below, searches or queries are based on molecular identifiers, and query results will comprise various molecular data corresponding to the identifiers. "Molecular identifier" as used herein means any name, symbol or coded identifier or indicia used to uniquely identify a molecule or collection of related molecules. For example GenBank accession numbers, Unigene cluster ID's, LocusLink ID, RefSeq Accession numbers, proprietary ID's such as Incyte, or Celera sequence ID's, etc., represent such molecular identifiers. Additional molecular identifiers are described below. "Molecular data" or "biomolecule data" as used herein means any information associated with a molecular identifier(s), and may comprise, for example, a collection of related molecular identifiers and associated information (annotations) associated with these identifiers.

Briefly, in the operation of the system 10, a user of client computer 12 formulates a query or search request based on a name, identification code or other indicia for a molecule of interest. The molecule may comprise, for example, a particular protein or the gene sequence encoding that protein. This query is submitted to name server 16 via name service API 20. Directory service application 23 then attempts to look up the molecule name or identifier in the database 18. Any information in database 18 associated with the molecule name or identifier in the query is retrieved or fetched from the database 18 by directory service application 23. This information is resolved according to a desired scheme or schemes by the name service API 20, which returns the results to client computer 12. The client application 12 then presents the information to the user via suitable visual interface, and may, in the case of ambiguous results, prompt the user to make a selection from the results and/or modify and re-submit a query.

Figure 2:
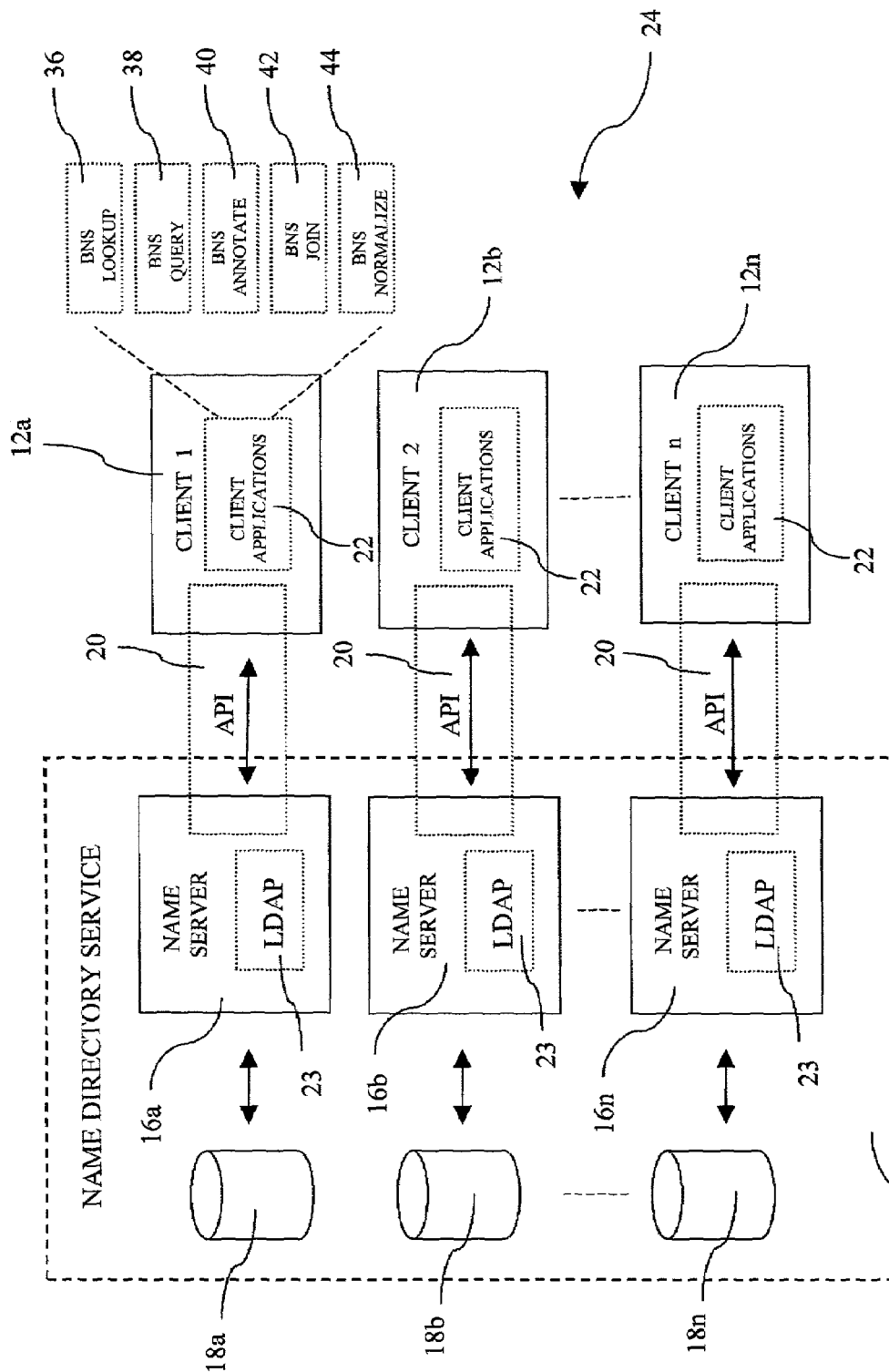
FIG. 2 is a functional block diagram of a biomolecule naming system in accordance with the invention.

The naming systems of the invention, in many embodiments, will comprise multiple computers and databases that are interconnected via the Internet or other computer network. One such embodiment is shown in a client server system. One such embodiment is shown in the biomolecule naming system 24 of FIG. 2, wherein like reference numbers are used to denote like parts. The biomolecule naming system 24 includes a plurality of client computers 12a, 12b, 12n that are operatively coupled to a biomolecule name directory server system 26. Biomolecule name directory server system 26 includes a plurality of biomolecule name servers 16a, 16b, 16n. Biomolecule name server system 26 includes a plurality of databases 18a, 18b, 18n wherein are stored genomic data, proteomic data and other biotechnology-related data as described further below. The various client and server machines of FIG. 2 are interconnected via computer network or networks, which may comprise a public network such as the Internet and/or one or more private networks.

Client computers 12a–12n each may comprise a data processor such as a minicomputer, a microcomputer, a UNIX®machine, mainframe machine, personal computer (PC) such as INTEL®, APPLE®, or SUN® based processing computer or clone thereof, or other appropriate computer. Client computers 12a–12n may also include typical computer components (not shown), such as a motherboard, central processing unit (CPU), memory in the form of random access memory (RAM), hard disk drive, display adapter, other storage media such as diskette drive, CD-ROM, flash-ROM, tape drive, PCMCIA cards and/or other removable media, a monitor, keyboard, mouse and/or other user interface, a modem, network interface card (NIC), and/or other conventional input/output devices. Client computers 12a–12n may comprise conventional desktop or "tower" machines in many embodiments. Each client computer 12a, 12b, 12n may comprise, loaded in its memory, an operating system (not shown) such as UNIX®, WINDOWS® 98, WINDOWS® ME, WINDOWS® 2000 or the like. Each client computer 12a–12n may further have loaded in memory a Web Browser program (not shown) such as NETSCAPE NAVIGATOR®, INTERNET EXPLORER®, AOL®, or like browsing software for client computers.

Client computers 12a–12n each may comprise client applications or programs 22 that provide for creation of user queries or requests based on biomolecule names or identifiers, identifying terms or other indicia and accepting resultant data from the queries. Programming 22 may be the form of electronically, optically, or magnetically stored code or other form of computer readable stored code, that is loaded in the RAM or other memory of client computers 12a–12n. In the embodiment of FIG. 2, client applications 22 comprise several applications that are shown as a biomolecule name system (BNS) lookup application 36, a biomolecule name system (BNS) query application 38, a biomolecule name system (BNS) annotation application 40, a biomolecule name system (BNS) joining application 42, and a biomolecule name system (BNS) normalizing application 44, which are each described separately below.

Client applications 22 may also include one or more resolver programs (not shown) that extract information from a biomolecule name server 16a–16n in response to client requests. The resolvers are able to access at least one biomolecule name server 14a–14n and use that biomolecule name server's information to answer a user query directly, or pursue the user query using referrals to other biomolecule name servers. The resolvers may be system routines that are directly accessible to other programming aspects of applications 22, and thus no protocol is necessary between the resolvers and client applications. In certain embodiments of the invention, one or more aspects of client application 22 may reside within the memory of biomolecule name server 16a–16n as part of server application 20, instead of client applications 18, and user interface aspects of the programming may be embedded in HTML pages for presentation to users of client computers 12a–12n.

The biomolecule name servers 16a–16n may comprise any standard data processing device or computer capable of acting in a server capacity in a client-server computer network system. Such data processors may comprise a minicomputer, a microcomputer, a UNIX® machine, a mainframe machine, a personal computer (PC) such as INTEL® based processing computer or clone thereof, an APPLE® computer or clone thereof or, a SUN® workstation, or other appropriate computer. Biomolecule name servers 16a–16n may include conventional computer components (not shown) such as a motherboard, central processing unit (CPU), random access memory (RAM), hard disk drive, display adapter, other storage media such as diskette drive, CD-ROM, flash-ROM, tape drive, PCMCIA cards and/or other removable media, a monitor, keyboard, mouse and/or other user interface means, a modem, network interface card (NIC), and/or other conventional input/output devices. Each biomolecule name server 16a–16n has stored in its memory a server operating system (not shown) such as WINDOWS®NT, UNIX®, NOVELL®, SOLARIS®, or other server operating system. Each biomolecule name servers 16a-16n also has loaded in its memory web server software (also not shown) such as NETSCAPE®, INTERNET INFORMATION SERVER™ (IIS), or other appropriate web server software loaded for handling HTTP (hypertext transfer protocol) or requests in other protocols, from client computers 12a–12n.

Client computers 12a–12n are operatively coupled to biomolecule name servers 16a–16n via the Internet (not shown) or other computer network using DSL (digital subscriber line), telephone connection with a modem and telephone line via an internet service provider (ISP), wireless connection, satellite connection, infrared connection, or other means for establishing a connection to the Internet. Biomolecule name servers 16a–16n may be connected to the Internet by a fast data connection such as T1, T3, multiple T1, multiple T3, or other data connection. Client computers 12a, 12b, 12n and biomolecule name servers 16a–16n may communicate using the TCP/IP (transfer control protocol/internet protocol) or other network communication protocol.

Biomolecule name server system 26 is extensible and re-configurable as required by the number and types databases 18a–18n involved, the number of client computers 12a–12n and level of traffic between client computers 12a–12n and server system 26 and/or other considerations. Thus, additional biomolecule name servers 16a–16n may be added to or removed from the system 26 according to need.

Load bearing considerations for the various biomolecule name servers 16a–16n may be based on traffic levels or other factors.

Biomolecule name servers 16a–16n each include a directory service application 23 configured to handle databases of descriptive, attribute-based information. The directory service 23 preferably does not need to implement complicated transaction or roll-back schemes that are required for doing high-volume complex updates. Directory service 23 is configured to give quick-responses to high-volume lookup or search operations instigated by users of client computers 12a–12n, and may have the ability to replicate information widely in order to increase availability and reliability, with reduced response time.

Directory service 23 may be configured in various ways as is known in the art according to the different kinds of database information involved, requirements on how database information is to be referenced, queried and updated, security considerations to prevent unauthorized access, and other such considerations. Each directory service 23 may be localized on a single biomolecule name server 16a–16n, or various aspects of directory service 23 may be distributed amongst multiple biomolecule name servers 16a–16n to provide a more global server to users of client machines 12a–12n. Directory service 23 may provide a uniform namespace to provide a uniform representation of query results to all users of client machines 12a-12n.

Directory service 23 is shown in the embodiment of FIG. 2 as an LDAP (Lightweight Data Access Protocol) directory service 23, with name servers 16a–16n operating as LDAP servers. LDAP (Lightweight Data Access Protocol) is a directory service designed to provide access to the X.500 Directory without incurring the resource requirements of the Directory Access Protocol (DAP). This protocol was designed for simple management applications and browser applications that provide simple read/write interactive access to the X.500 Directory. LDAP offers a lightweight system with a great degree of flexibility, and not only provides facilities for information lookup, but also provides protocols for modifying, adding to, or removing from directory content. LDAP has the ability to return complex data objects that can include open-ended lists of items. As such, the use of LDAP for directory service 22 can provide a variety of useful bioinformatic services as described further below.

The slapd (stand-alone LDAP daemon) model for directory service protocol conveniently runs over TCP/IP. The LDAP directory service model is based on entries, each of which comprises a collection of attributes that has a "distinguished name" (DN). The DN is used to refer to entries unambiguously. Entry attributes each have a "type" based on mnemonic strings, and one or more values based on the type of attribute. LDAP allows control of which attributes are required and allowed in an entry through use of "objectclass" attributes, the values of which determine the schema rules that apply to each entry. Directory entries are arranged in a hierarchical tree-arrangement according to the nature of the underlying data. Each entry is referenced according to its DN.

In specific embodiments of the invention, LDAP directory service 23 may comprise the qcslapd (Qualcomm stand-alone LDAP daemon) source publicly released by Qualcomm (Eudora freeware LDAP server, www. Eudora.com/free/ldap.html). Other LDAP versions may be used in other embodiments (http://www.umich.edu/~dirsvcs/ldap/), OpenLDAP (http://www.openldap.org/, and Iplanet, (http://www.iplanet.com/products/). Various other derivatives of slapd are available from the University of Michigan that support caching of database indexes in memory.

One aspect of LDAP, as an underlying architecture for the system 24, is that that LDAP supports data replication as well as query referrals. This replication permits data to be automatically propagated throughout the biomolecule name server system 26. In this regard, a dedicated replication server replication databases (not shown) may be included in the biomolecule naming system 24. In the biomolecule naming system 24, a large amount of stored genomic and proteomic data can be made widely available with a fairly modest computing infrastructure. As a result, the users of clients 12a–12n can have local high-throughput repositories of data, associated with local biomolecule name servers 16a–16n, that are constantly and automatically updated.

With LDAP directory service 23, users of the system 24 can directly obtain desired genomic and proteomic data from databases 18a–18n without having to ftp (file transfer protocol) from public servers, extract and parse flat files, reload data into local proprietary databases, or to subscribe a commercial service to perform these operations. Further, with the query referral ability of LDAP, available data can be highly optimized and distributed. Only that data which is likely to be relevant to a particular user need be stored locally. Queries for a typical data can be automatically and transparently referred to remote biomolecule name servers 16a–16n containing that data (albeit with a slight performance penalty). Another extension of LDAP replication useful for biomolecule data in accordance with the invention is to provide the ability to monitor incoming data entries with user-defined agents. In this way, notifications can be made, via email or other communication, to notify users of client computers 12a–12n when new or modified data entries of particular interest are detected.

Another aspect of LDAP is that it provides security facilities to limit and manage access to specific users. Some implementations of LDAP also support encrypted connections using SSL (secure socket layer). Thus, LDAP implementations are available to provide proprietary data within a secure context, for embodiments of the invention that require such security.

Still another desirable aspect of LDAP and its supporting code libraries is LDAP's basis on open, established standards. A minimal amount of infrastructure is required to support LDAP, and LDAP generally does not require proprietary database connectivity software, ODBC drivers, or other features. LDAP is supported by a wide variety of vendors, including Microsoft, Sun, Netscape, Oracle and others. Both proprietary and open source toolkits are available for writing LDAP applications.

It is again noted that other directory services or interfaces based on protocols other than LDAP may alternatively be used with the invention. Such directory services should avoid complex transaction or roll-back schemes, provide protocol elements that are carried directly over TCP/IP or other transport mechanisms to allow bypassing or avoiding session/presentation overhead, and protocol data elements should be able to be encoded as ordinary strings (such as "Distinguished Names"), with a lightweight BER encoding used for protocol elements.

Databases 18a–18n each may be associated with a corresponding one of the biomolecule name servers 16a–16n as shown in FIG. 2. Databases 18a–18n include genomic, proteomic or other biotechnology data for use by biomolecule name servers 16a–16n. One or more of databases 16a–16n may be proprietary, or may be accessed subject to user authentication or other security consideration. The data may be conditioned using LDIF (LDAP Data Interchange Format).

Databases 18a–18n may be based on data from a variety of public database sources, which may be arranged in various database structures or organizational schemes. Such public databases may include molecular, genetic, organism-based, gene expression, bibliographic, or other type of genomic information and proteomic information. Public, Internet-accessible data bases that provide information that may be used with the invention include, by way of example, LocusLink (http://www.ncib.nlm.nih.gov/LocusLink/), GeneCards (http://www.bioinfo.weizmann. ac.il/cards/), COGS (www.ncbi.nlm.nih.gov/COG/), the Gene Ontology Database (www.geneontology.org/), European Molecular Biology Laboratory Nucleotide Sequence Data Library (EMBL) (http://www.emblheidelberg.de/), DNA Database of Japan (DDBJ) (http://www.ddbj.nig.ac.jp/), Genbank (http://www.ncbi.nlm. nih.gov/Genbank/Genbank-Search.html), Swiss-Prot. (http://www.expasy.ch/sprot/sprot-top.html), Genome Database (GDB) (http://gdbww-w.gdb.org), Online Mendelian Inheritance in Man (OMIM) (http://www3.ncbi.nlm.nih.gov/Omim/), Cellular Response Database (http://LHI5.umbc.edu/crd), dbEST (http://www.ncbi.nlm.nih.gov/dbEST/index.html), Globin Gene Server (http://globin.cse.psu.edu, Human Developmental Anatomy, ("httD://www.ana.ed.ac.uk/anatomv/database/humat/") Kidney Development Database, (http://www.ana.ed.ac.uk/anatomy/database/kidbase/kidhome. Html), Merck Gene Index (http://www.merck.com/mrl/merck_gene_index.2.html), Tooth Gene Expression Database (http://bite-it.helsinki.fi/), and like databases. Various proprietary databases of useful information are also accessible via the Internet for a fee or on a subscription basis, such as Incyte's LIFESEQ® (http://www.incyte.com/) sequence/index.shtml), and DOUBLETWIST™ (https://genomezone.doubletwist.com/). Various other public-accessible databases are known and will suggest themselves to those skilled in the art.

Name service API 20 may include programming elements or objects that reside on client computers 12a–12n and/or name servers 16a–16n. Name service API 20 programming is capable of receiving queries generated by client application 22 as described below and presenting these queries to name servers 16a–16n according to the protocol of the directory service. The name service API programming 20 is also capable of receiving the raw query results from the name servers 16a–16n, resolving the query results according to a desired scheme for return to the clients 12a–12n.

Resolution of the query results by API 20 may comprise, for example, organizing the search results according to one or more molecular identifiers or identifier schemes, converting or translating between identifier types, converting or translating between entity type identifiers, converting or translating identifiers between orthologous groups, or other form of query result resolution. For example, The results from a query based on a common gene name or gene symbol may include a variety of heterogeneous information including Unigene ID number, a mRNA RefSeq number, RefSeq number for the corresponding protein encoded by the mRNA, a Genbank accession number, "GO" (Gene Ontology) topics (component, process or function), chromosome location, text description, or other information, which may be resolved or formatted by API 20 according to a desired scheme or format. Additional molecular identifiers are described below with reference to the client applications 36–44.

Name service API 20 may also resolve query results by conversion of an identifier from one molecular entity type to another. Thus, for example, query results based on a nucleic acid identifier may be converted to a corresponding protein identifier, and related data for the protein encoded by the nucleic acid. Resolution of query results may be based on orthologous conversion, i.e., from a biomolecular identifier for one species to a corresponding identifier for another species. In another example, Name service API 20 may also resolve query results by conversion of an alias name into an official unique name. Numerous other ways for query result resolution are possible by name service API and will suggest themselves to those skilled in the art The query results for client applications 38–44 described below present some additional query results resolutions that may be provided by name server API in accordance with the invention.

Client applications 22 may be written in Java using Sun's Java Naming and Directory Interface™ (JNDI, http://www-w.java.sun.com/products/jndi) as well as Microsoft Visual C++ using Microsoft's Active Directory Service Interfaces (ADSI, http://www.microsoft.com.adsi), or other object-oriented programming. The following exemplary applications 36–44 discussed below are configured to handle queries and query results based on molecular identifiers and indicia that are in common use, such as gene accession numbers, Unigene identifiers, gene symbols, Locus ID, common gene name, gene description, and chromosome location. However, other suitable indicia may alternatively be used. The public database LocusLink (http://www.ncib.nlm.nih.gov/LocusLink/) includes curated or partly curated data based on gene accession numbers, Unigene identifiers, gene symbols, Locus ID, common gene name, gene description, chromosome location, "GO"-related topics such as "GO Process", "GO Component" and "Go Function", text summaries, product text descriptions, mRNA RefSeq numbers, protein RefSeq numbers, or other identifiers. For reasons of clarity, the various aspects of client applications 22 are described below in terms of these molecular identifiers. It is again noted, however, that any molecular identifiers, ID or indicia may be used with the invention.

Client applications 22 include a biomolecule name system (BNS) lookup application 36 application, as noted above. This application accepts an accession number, Unigene identifier, gene symbol or other molecular identifier, and retrieves the matching record(s) if any from biomolecule name servers 14a–14n. This functionality can, in certain embodiments, be used to directly interrogate public databases. However, BNS lookup application 36 is useful for inspecting data as it is obtained from biomolecule name servers 14a–14n.

Biomolecule name system (BNS) query application 38 accepts a general query and returns a list of matching biomolecule name server entries. The list may consist of tab-delimited lines, where each line contains the following: Locus ID, Unigene cluster, gene symbol, gene description and chromosome location. Where databases 16a–16n include formatted Gene Ontology data from, for example, LocusLink, the BNS query application allows quick generation of gene lists around specific GO-related topics. This easy generation of gene lists is very useful, for example, in the creation of custom microarray designs based on specific topics of investigation. The BNS query application also allows searching of the description field, and summary information provided by data from LocusLink.

The Biomolecule name system (BNS) annotate application 40 is configured to accept an input file of tab-delimited text where one of the columns is a molecule identifier (e.g.

accession number, Unigene ID, or the like as noted above). Using these identifiers, annotation information is obtained from the biomolecule name servers 14a–14n and appended to each line as appropriate. This application is useful for annotating a previously un-annotated list, and for re-annotation tasks. Since this process typically takes on the order of a few minutes, and can process large batches of sequence ID's, the annotation task can be re-run whenever the data in databases 16a–16n is updated with newer versions from public databases. In this way, annotations, which may change over time, can be maintained with the latest curated information available. The annotate application 40 also makes it possible to compare older annotations with newer ones to determine where changes have occurred, in cases where such changes are of interest to users.

The biomolecule name system (BNS) join application 42 combines two tab-delimited files by appropriately concatenating lines with related identifiers. This allows, inter alia, the combining of the results of DNA microarray experiments with protein measurements (possibly from protein arrays), without requiring that they use a common identifier. The only requirement is that there must exist some relationship between the gene identifier and the protein identifier. For example, there is information extant that relates RefSeq mRNAs to corresponding RefSeq Protein counterparts. The BNS join application similarly allows associating data from different microarray designs. It is possible to construct unions as well as intersections of such data.

The biomolecule name system (BNS) NormalizeID application reads a tab-delimited file where one column contains molecule identifiers from potentially different naming schemes. A new column is then appended which maps all identifiers to a single user-specified identifier scheme. For example, a file containing a mixture of RefSeq and Unigene identifiers can all be mapped to UniGene equivalents.

Methodology

Figure 3:
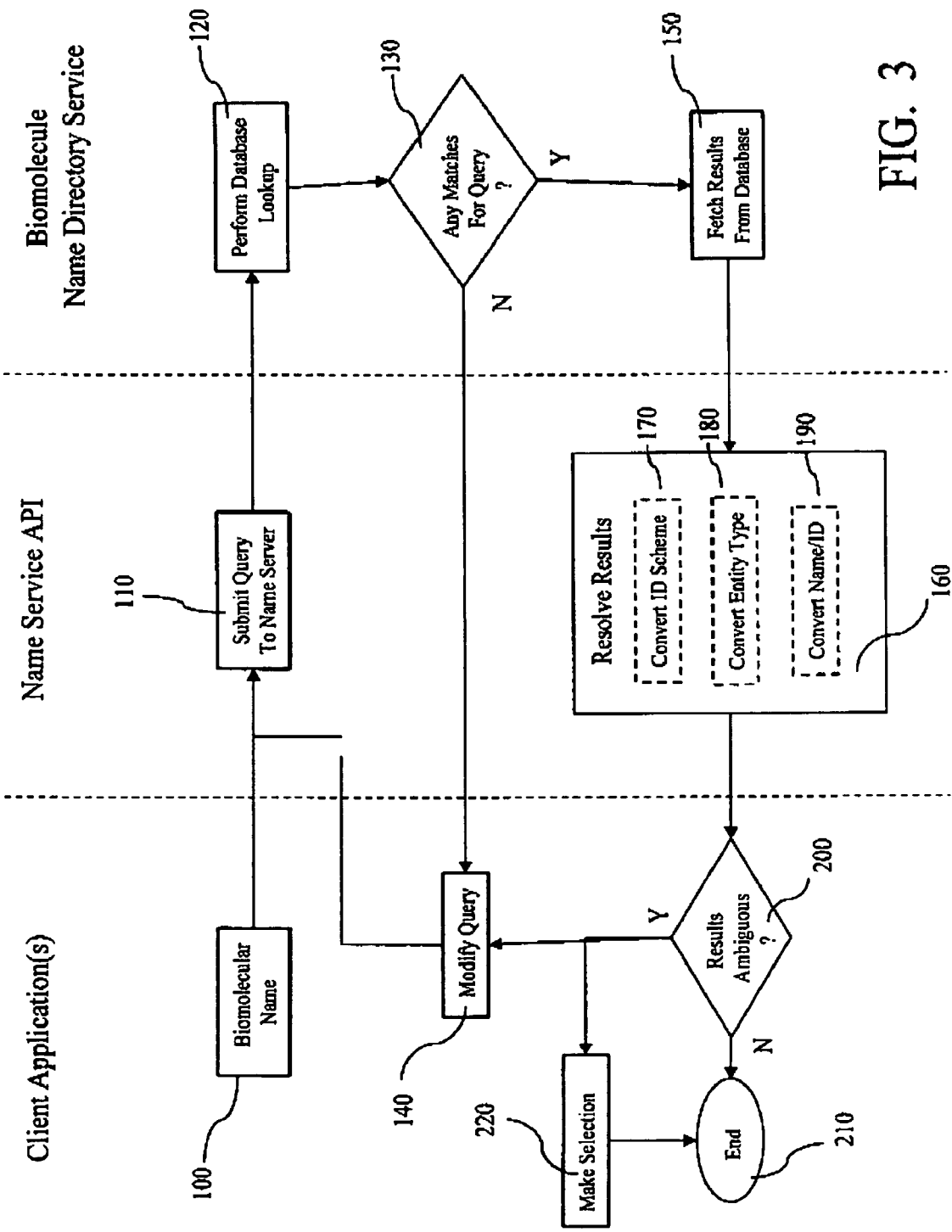
FIG. 3 is a flow chart illustrating the methods of the invention.
Figure 5:
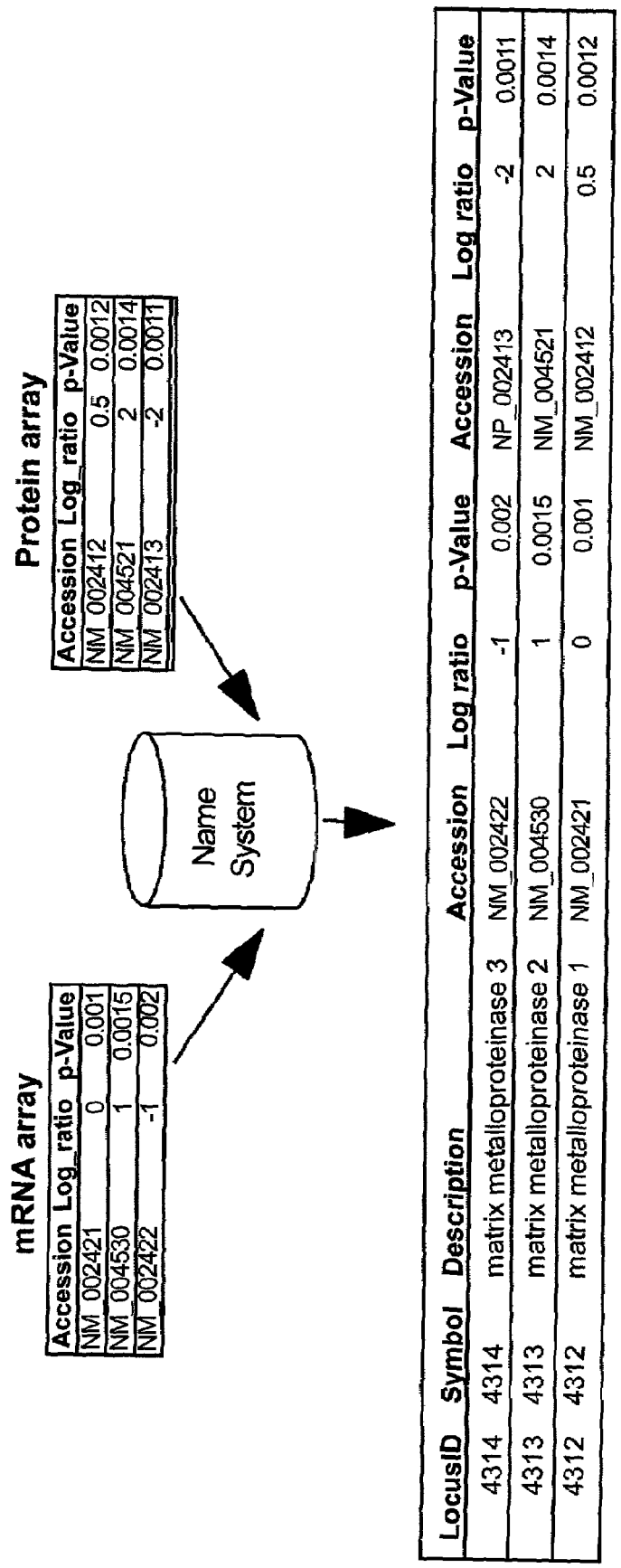
FIG. 5 is a flow chart illustrating the combination of mRNA data and protein data by a name join application of the invention.

Referring now to FIG. 3, as well as FIG. 2, the methods of the invention will be more fully understood. In event 100, a query is created, formulated, or otherwise prepared by client applications 22 according to the instructions of a user of client computer 12a14 12n. The molecular identifier may comprise any molecular indicia, such as gene accession numbers, Unigene identifiers, gene symbols, Locus ID, common gene name, gene description, and chromosome location, or other indicia. The user may formulate a query by entering the molecular identifier or indicia at the prompting of a visual interface generated by client applications 22 and displayed on the display (not shown) of client computer 12a–12n. Such visual interface may comprise, for example, a displayed field usable for keyboard entry of alphanumeric symbols, pull-down menus, "clickable" icons, or other visual interface features known in the art.

Depending upon the nature of the query and the type of information sought by the user, one or more of applications 38–44 may be involved in this event. Specific query and query result examples using the BNS lookup application 38, BNS query application 40 and BNS join application 42 are discussed below.

At event 110, the query of event 100 is submitted to one of the biomolecule name servers 16a–16n of name server system 26. This submission may be, for example, in the form of an HTTP request with embedded data representing the molecular name-based query of event 100. The request is handled by name service API 20, which may condition the request according to name directory service protocol.

Selection or assignment of a particular biomolecule name server 16a–16n may also be carried out in event 110. Particular servers 16a–16n may be designated to handle queries from particular clients 12a–12n based on various criteria. Due to the facile replication of data provided by LDAP, in many embodiments all biomolecule name servers 16a–16n will have access to the same data, and the association of a particular client 12a–12n with a particular server 16a–16n may be based on traffic levels and/or geographic location. In other embodiments, certain servers 16a–16n may be configured to handle certain types of queries, and clients 12a–12n making such queries may be directed to those specific servers. In still other instances, certain servers 16a–16n may have access to proprietary databases that are not available all clients 12a–12n, and only authorized users may access such servers. Various load balancing considerations for client-server systems are known in the art, and may be used in the present invention.

In event 120, a lookup in one or more of databases 18a–18n is carried out by a name server 16a–16n according to the query created in event 100. The information in databases 18a–18n may be conditioned in LDIF as noted above in order to allow quick response, high volume lookups by many users. Directory service 23 performs this lookup event.

At event 130, name server 16a–16n makes a determination as to whether or not any matching data exists in database 18a–18n for the query formed in event 100. If no matches exist and results for the query are not found, event 140 may occur. If yes, a result or results for the query exists, and event 150 occurs.

In event 140, the user of client computer 12a–12n may be notified that no results were found for the query created by the user in event 100, and may be invited to modify the query. Query modification in event 140 may involve the submission of a different molecular identifier, or the inclusion of additional information or indicia to "narrow" the query. This event may be carried out by the user of client computer 12a–12n via suitable visual interface associated with client applications 38–44 as described in event 100 above. The modified query of event 140 may be then resubmitted by repeating events 110–130 above.

In event 150, the matching results determined in event 130 are fetched or retrieved from database 18a–18n by name server 16a–16n for return to client computer 12a–12n.

At event 160, the query results retrieved in event 150 are resolved by name service API 20. This resolution may be carried out according to various selectable naming and identifier schemes. This allows resolution of biomolecule names and identifiers from different, but related data sources. In many embodiments, the resolution of the search results may comprise presenting the query results according to the molecular identifier originally used in the query formed in event 100. The results may be formatted according to the protocol of the name directory service 26. The query results based on one identifier may, in this step, be converted and resolved according to a different, related identifier. Some exemplary resolution operations carried out by name service API are shown in sub-events 170–190 described below.

In sub-event 170, the resolution of query results by name service API 20 comprises conversion of the query results according to a selectable identifier (ID) scheme. For example, query results based on one form of gene identifier may be converted for presentation to the user based on another, different identifier for that gene. More specifically, query results based on a gene symbol may, for example, may be converted to the corresponding Genbank accession number or other identifier for subsequent presentation to a user.

In sub-event 180, resolution of query results may be carried as an "entity" conversion, i.e., gene or nucleic acid to the corresponding protein, or vice versa. Thus, for example, where a query formed in event 100 is based on a gene name or gene identifier, the query results may be resolved and presented in terms of the corresponding name or other identifier for a protein encoded by that gene. Similarly, queries based on protein identifiers may be resolved according to identifiers associated with the corresponding nucleic acid or gene encoding the protein. In other embodiments, entity conversion in event 180 may comprise resolving query results according to orthologous entities. For example, a query based on a gene identifier for one species may be used to return results that includes information for the corresponding gene in a different species.

In sub-event 190, resolution of query results may comprise conversion of the results from a molecular name-based organization to an organization of query results according to a different identifier corresponding to the named molecule, and vice versa. Resolving of query results may also comprise annotation of query results according to various supplementary data stored in the directory service 23. For example, chromosome location, molecular function, or descriptive text can be included in the query results.

Various other ways to resolve query results according to desired criteria or conversion schemes may be used in event 160. For example, a queries made using a private or proprietary molecular identifier may be resolved using a public molecular identifier, and vice versa. Similarly, queries based on an alias name may be resolved according to an official name. Additional resolutions using other molecular identifiers or indicia will suggest themselves to those skilled in the art and are also considered to be within the scope of this disclosure.

The protocol of directory service 23 is preferably configured to avoid such ambiguities in query results retrieved from databases 18a–18n. However, queries based on molecular identifiers could potentially lead to a one-to-many or many-to many association. Thus, at event 200, a determination may be made by client applications 22 as to whether or not any ambiguities exist in the results provided in event 160. If no, the process of FIG. 3 is complete and ends at event 210. The user of client may repeat events 100–210 to make additional queries and obtain additional query results.

If a yes determination is made in event 200, two or more results exist that are responsive to the query, for which an un-ambiguous choice cannot be made by the logic of name service API 20. In this case, event 140 may be repeated wherein the user modifies the query to attempt to avoid the ambiguous result. Alternatively, event 220 may be carried out, in which the client applications 22 prompt the user to make a selection of one or more of the results.

As can be seen from the above, a variety of useful high-throughput data manipulations can be facilitated with the biomolecule naming system 24. For example, a query based on a gene name or symbol can provide a variety of responsive, formatted data associated with the gene name or symbol. As a specific example, raw data from the LocusLink database was conditioned in LDIF for LDAP directory service 23 in accordance with the invention, and a query by BNS lookup application 36 based on the gene symbol "TNF" was made. FIG. 4 shows a visual interface response or result that provides the query results resolved according to the gene symbol "TNF". The query results are presented in the form of text fields for the information available in the data from LocusLink. This information includes the corresponding locus ID, organism name, text description, Unigene ID, mRNA RefSeq, protein RefSeq, product text description, GO Process text description, GO Component, GO Function, Chromosome location and text summary for the "TNF" identifier used in the query. The visual interface shown in FIG. 4 may, of course, be presented in numerous ways to a user, and the particular interface shown in FIG. 4 is merely exemplary.

The systems and methods of the invention provide for translating between mRNA and Protein accession numbers. Name server 16a–16n, together with a relatively small amount of client-side logic provided by client applications 22, can identify corresponding pairs of mRNA and Protein RefSeq accessions numbers programmatically from database 18a–18n. This information can then be used to associate or combine mRNA expression measurements with corresponding measurements of protein abundance, even when the identifiers schemes are different but relatable accession numbers.

The BNS join application 42, as noted above, combines two tab-delimited files by appropriately concatenating lines with related identifier, which allows combining of the results of DNA microarray experiments with protein array measurements without requiring use of a common identifier, provided that there exists information that relates RefSeq mRNAs to corresponding RefSeq Protein counterparts. This operation of BNS join application 42 is illustrated schematically in FIG. 5.

The invention also provides for annotating existing, un-annotated gene-related data. The BNS Annotate application 40 may be used to add annotations to existing data sets being used by computational biologists. Particularly, the invention provides the ability to easily add chromosome mapping information to large sets of data which previously had no such annotations.

The annotating and re-annotating of pre-existing DNA microarray designs is also possible with the invention. Often, no annotation is initially provided for a microarray design. With the BNS Annotate application 40, it is a relatively trivial process to take an existing gene list and create an annotated version. Further, this list can be re-annotated as needed to incorporate the latest up-to-date annotations from databases of interest. The re-annotation process can be automated so that fresh annotations are generated on a regular basis without user intervention. An exemplary visual display for a re-annotation result using BNS annotate application 40 on conditioned LocusLink data is shown in FIG. 6

The BNS Query application may be used to generate gene lists for new DNA microarray designs based on specific ad hoc topics of interest. For example, it is possible to quickly create an annotated list of all mRNAs in LocusLink or other database that are listed with a GO function of apoptosis. The visual display for a specific query result based on the Go Function "Apoptosis" for the organism Homo Sapiens, again using conditioned LocusLink data, is shown in FIG. 7.

The invention may be used with data from other publicly accessible databases. For example, the COGS "Clusters of Orthologous Groups of proteins" database (www.ncbi.nlm-.nih.gov/COG/) can be interrogated with the system of the invention. In this case, search result data can be returned to the user in according to a particular COG ID. The attributes may comprise, for example all the protein and/or gene IDs for a given COG, with sub-annotations indicating the source organism or species.

A well curated vocabulary is available in the form of "Gene Ontology" that is promoted by the Gene Ontology Consortium (www.geneontology.org/). This vocabulary is used by several database sources to annotate the function and classification of genes and proteins. The invention may be used to provide fast, high-volume lookup of ontology classifications according to gene names or identifiers.

The invention also has pathway lookup capability, and may used to provide mappings into biomolecular pathway information. A query based on a molecular ID such as an accession number can return a group of data corresponding to all pathways in which the molecule participates, and ultimately all of the molecules in a given pathway.

Many additional uses of the invention are possible and will suggest themselves to those skilled in the art. The particular client applications and examples described above are only illustrative, but should indicate the broader possibilities inherent in the systems and methods of the invention once high-speed programmatic access to such data has been provided. The above examples represent "batch processing" of tens of thousands of genes or proteins at a time. While obtaining information of this kind is possible using public data sources, it is difficult and time consuming to obtain such data, and available bioinformatics data access systems cannot achieve information return in an automated, high-throughput fashion as provided by the invention. For example, one can retrieve batch queries from the Genbank database via the Internet, but only in subsets of 500 sequences at a time. This data must then be parsed into the data structures required by the requesting application. The use of LDAP as provided by the invention allows direct access to the underlying data model, including enumerating individual attributes. Therefore, no additional parsing is necessary.

The systems and methods of the invention, as can be seen from the above, provide the performance and functionality for use in a number of tasks common to molecular biologists and bioinformaticians. Using the present invention, it is quite practical to convert molecular identifiers from one system to another in real-time. Similarly, it is possible to retrieve curated relationships (where available) to associate entities that have otherwise unrelated identifier schemes. While the genome coverage of the LocusLink database used in the specific examples above is substantial, numerous other public databases with useful information exist and may similarly be used.

By using LDAP interface facilities of name servers 16a–16n for query referrals and data replication, it is possible to create highly distributed, largely self-maintaining infrastructures. Such systems can ultimately provide a simple but powerful delivery mechanism for much of the available public genomic and proteomic data. Wider coverage of known genetic loci by publicly available databases, combined with a ubiquitous deployment of name servers 14a–14n and client applications 18, can provide a powerful new infrastructure useful to molecular biology.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A method for performing queries on molecular information, comprising:
   (a) creating a query based on a biomolecular name;
   (b) submitting said query to a biomolecular name directory service;
   (c) performing a lookup in a database of said biomolecular name directory service by a name sserver of said biomolecular name directory service; and
   (d) resolving a query result by a name service application programming interface according to variuos naming and/or identifier schemes.

2. The method of claim 1, wherein said creating said query is carried out by a client application, said client application capable of accepting said query result from said name service application programming interface.

3. The method of claim 1, further comprising returning said query result to said client application.

4. The method of claim 1, wherein said resolving comprises annotating said query result.

5. The method of claim 1, further comprising replicating data in said database by said biomolecular name directory service.

6. The method of claim 1, wherein said biomolecular name directory service comprises Light Weight Directory Access Protocol.

7. The method of claim 1, wherein said biomolecular name comprises a gene name.

8. The method of claim 1, wherein said biomolecular name comprises a gene symbol.

9. The method of claim 1, wherein said biomolecular name comprises a Locus Identification number.

10. The method of claim 1, wherein said biomolecular name comprises a chromosome location.

11. The method of claim 1, wherein said biomolecular name comprises an mRNA name.

12. The method of claim 1, wherein said biomolecular name comprises a protein name.

13. The method of claim 1, wherein said query is created using a first biomolecular name, and said query results are resolved using said first biomolecular name.

14. The method of claim 1, wherein said query is created using a first biomolecular name, and said query results are resolved using a second biomolecular name.

15. The method of claim 14, wherein said second name is related to said first name.

16. The method of claim 14, wherein one of said biomolecular names comprises a gene name.

17. The method of claim 14, wherein one of said biomolecular names comprises a protein name.

18. The method of claim 14, wherein one of said biomolecular names comprises an mRNA name.

19. The method of claim 14, wherein one of said biomolecular names comprises a proprietary biomolecular name.

20. The method of claim 14, wherein one of said biomolecular names comprises a public biomolecular name.

21. The method of claim 14, wherein one of said biomolecular names comprises an alias name.

22. The method of claim 14, wherein one of said biomolecular names comprises an official name.

23. The method of claim 14, wherein one of said biomolecular names comprises a gene name, and the other of said biomolecular names comprises a protein name.

24. The method of claim 14, wherein one of said biomolecular names comprises an alias name, and the other of said second biomolecular names comprises an official name.

25. The method of claim 14, wherein one of said biomolecular names comprises a proprietary biomolecular name, and the other of said biomolecular names comprises a public biomolecular name.

26. A system for performing queries on molecular information, comprising:
(a) means for creating a query based on a first biomolecular name;
(b) biomolecular name directory service means for performing a database lookup based on said query, and for fetching a query result based on said lookup;
(b) application programming interface means for submitting said query to said biomolecular name directory service means and for resolving said query result.

27. The system of claim 26, wherein said application programming interface means cómprises program means for resolving said query result according to said first biomolecular name.

28. The system of claim 26, wherein said application programming interface means comprises program means for resolving said Query result according to a second molecular identifier.

29. The system of claim 26. wherein said biomolecular name directory service means comprises Light Weight Directory Access Protocol.

30. The system of claim 26, wherein said biomolecular name directory service means comprises means for replicating said database.

31. The system of claim 28, wherein said second name is related to said first name.

32. The system of claim 28, wherein one of said biomolecular names comprises a gene name.

33. The system of claim 28, wherein one of said biomolecular names comprises a protein name.

34. The system of claim 28, wherein one of said biomolecular names comprises an mRNA name.

35. The system of claim 28, wherein one of said biomolecular names comprises a proprietary biomolecular name.

36. The system of claim 28, wherein one of said biomolecular names comprises a public biomolecular name.

37. The system of claim 28, wherein one of said biomolecular names comprises an alias name.

38. The system of claim 28, wherein one of said biomolecular names comprises an official name.

39. The system of claim 28, wherein one of said biomolecular names comprises a gene name, and the other of said biomolecular names comprises a protein name.

40. The system of claim 28, wherein one of said biomolecular names comprises an alias name, and the other of said second biomolecular names comprises an official name.

41. The system of claim 28, wherein one of said biomolecular names comprises a proprietary biomolecular name, and the other of said biomolecular names comprises a public biomolecular name.

* * * * *